(12) United States Patent
Nelson et al.

(10) Patent No.: US 8,314,623 B2
(45) Date of Patent: Nov. 20, 2012

(54) SYSTEM AND METHOD FOR MORE ACCURATE TEMPERATURE SENSING USING THERMISTORS

(75) Inventors: Brian Carl Nelson, Bath, MI (US); Christian G. Masson, Howell, MI (US); Marilyn L. Kindermann, Milford, MI (US); Brian K. Kowalczyk, Howell, MI (US)

(73) Assignee: GM Global Technology Operations LLC

( * ) Notice: Subject to any disclaimer, the term of this patent is extended or adjusted under 35 U.S.C. 154(b) by 254 days.

(21) Appl. No.: 12/882,488

(22) Filed: Sep. 15, 2010

(65) Prior Publication Data

US 2012/0062041 A1  Mar. 15, 2012

(51) Int. Cl.
*G01R 27/08* (2006.01)

(52) U.S. Cl. ............... 324/721; 324/750.03; 324/750.06; 324/431; 324/685; 374/1; 374/185; 374/163; 374/43; 702/99; 702/100

(58) Field of Classification Search .................. 324/721, 324/431, 750.03, 750.06, 105, 670, 685; 374/1, 112, 110, 114, 183, 185, 43, 166, 374/32; 338/22 R, 28, 25; 361/27, 106, 361/24, 158
See application file for complete search history.

(56) References Cited

U.S. PATENT DOCUMENTS

| | | | |
|---|---|---|---|
| 7,104,684 B2 * | 9/2006 | Felder | 374/178 |
| 2007/0122173 A1 * | 5/2007 | Mitsuoka et al. | 399/69 |
| 2007/0160108 A1 * | 7/2007 | Kent | 374/54 |
| 2011/0106476 A1 * | 5/2011 | Son et al. | 702/99 |

* cited by examiner

*Primary Examiner* — Huy Q Phan
*Assistant Examiner* — Thang Le

(57) ABSTRACT

A system includes a first module, a second module, and a third module. The first module determines a first temperature and a first power dissipation value of a thermistor based on a resistance of a first resistor connected in series with the thermistor. The second module, after disconnecting the first resistor and connecting a second resistor in series with the thermistor, determines a second temperature and a second power dissipation value of the thermistor based on a resistance of the second resistor. The third module determines a thermal dissipation factor based on the first and second temperatures and the first and second power dissipation values, and corrects temperature sensed by the thermistor based on the thermal dissipation factor.

20 Claims, 5 Drawing Sheets

SYSTEM AND METHOD FOR MORE ACCURATE TEMPERATURE SENSING USING THERMISTORS

FIELD

The present disclosure relates to temperature sensing and more particularly to a system and method for more accurate temperature sensing using thermistors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Thermistors include resistors that have a variable resistance based on temperature. Thermistors, therefore, may be implemented in temperature sensors. Specifically, thermistor-based temperature sensors may be more accurate than other temperature sensors such as resistance temperature detectors (RTDs). Thermistors may further include negative temperature coefficient (NTC) and positive temperature coefficient (PTC) thermistors. More specifically, when temperature increases NTC thermistors decrease in resistance whereas PTC thermistors increase in resistance.

SUMMARY

A system includes a first module, a second module, and a third module. The first module determines a first temperature and a first power dissipation value of a thermistor based on a resistance of a first resistor connected in series with the thermistor. The second module, after disconnecting the first resistor and connecting a second resistor in series with the thermistor, determines a second temperature and a second power dissipation value of the thermistor based on a resistance of the second resistor. The third module determines a thermal dissipation factor based on the first and second temperatures and the first and second power dissipation values, and corrects temperature sensed by the thermistor based on the thermal dissipation factor.

A method includes determining a first temperature and a first power dissipation value of a thermistor based on a resistance of a first resistor connected in series with the thermistor, disconnecting the first resistor and connecting a second resistor in series with the thermistor, determining a second temperature and a second power dissipation value of the thermistor based on a resistance of the second resistor, determining a thermal dissipation factor based on the first and second temperatures and the first and second power dissipation values, and correcting temperature sensed by the thermistor based on the thermal dissipation factor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
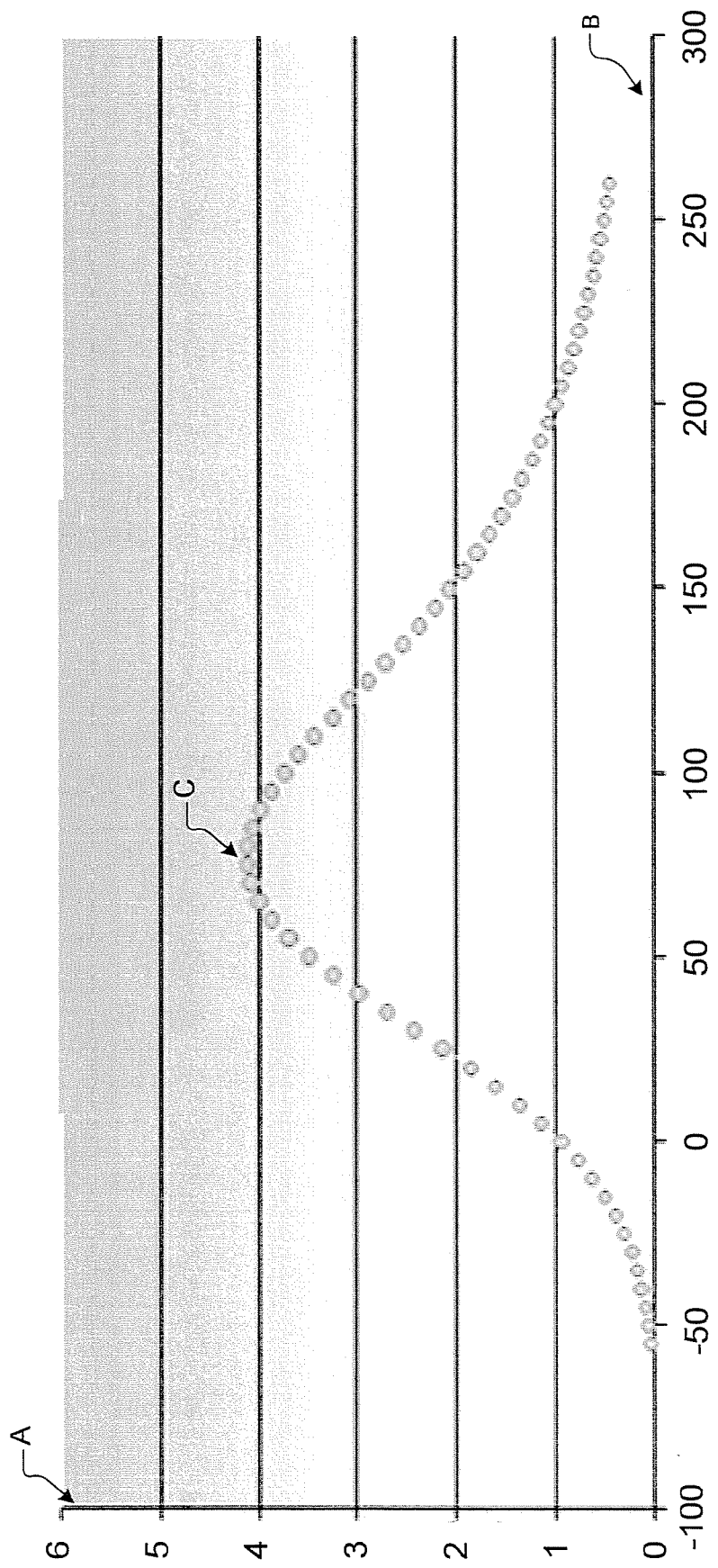
FIG. 1 is a graph illustrating self-heating effects of a thermistor.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Thermistors may suffer from "self-heating" effects. More specifically, heat may be generated by current flowing through the thermistor. The generated heat may raise the temperature of the thermistor above a temperature of the environment (i.e., ambient temperature). Self-heating, therefore, may cause error in the temperature sensed by thermistors. Moreover, the inaccurate temperature sensing may cause incorrect control of a temperature-based system.

Referring now to FIG. 1, self-heating effects of a negative temperature coefficient (NTC) thermistor are shown at various ambient temperatures. Specifically, a vertical axis ("A") represents a change in temperature and a horizontal axis ("B") on represents ambient temperature. The change in temperature refers to a difference between the temperature of the thermistor and the ambient temperature. For example, the vertical axis A and/or horizontal axis B may include degrees Celsius (° C.). As shown, a maximum change in temperature due to self-heating occurs at point "C." For example, point C may indicate a change in temperature of approximately 4° C. at an ambient temperature of approximately 75° C., which equals a significant error of 5 percent (i.e., 4° C./75° C.).

Accordingly, a system and method are presented that compensate for self-heating effects of thermistors. Specifically, the system and method determine first and second temperatures and first and second power dissipation values of the thermistor based on first and second resistances respectively. The system and method determine a thermal dissipation factor of the thermistor based on the first and second temperatures and the first and second power dissipation values. The system and method determine a temperature error based on the thermal dissipation factor of the thermistor. The system and method then correct the temperature sensed by the thermistor based on the temperature error.

Figure 2:
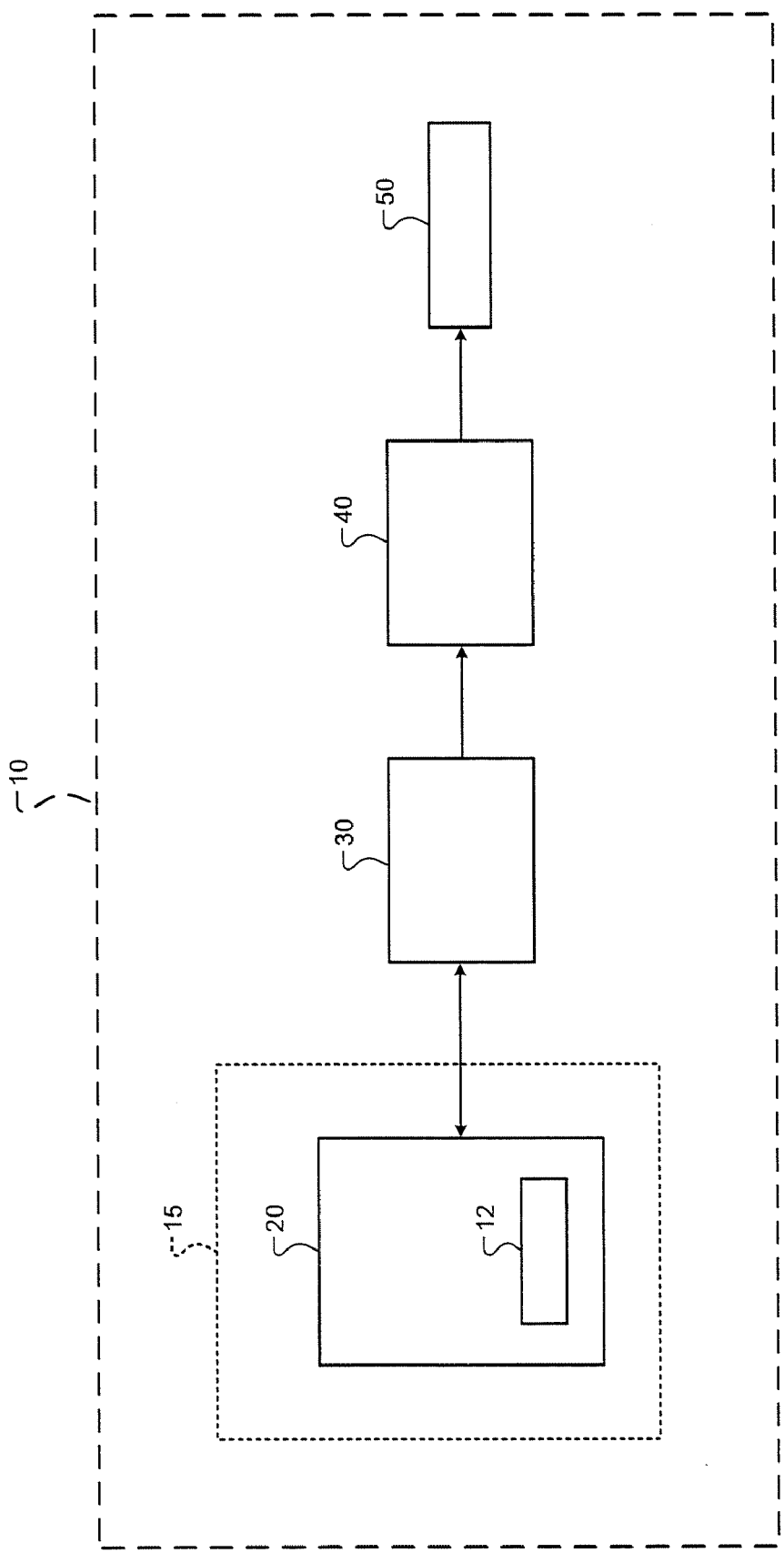
FIG. 2 is a functional block diagram of a system for correcting temperature sensed by a thermistor according to one implementation of the present disclosure.

Referring now to FIG. 2, a system 10 corrects temperature sensed by a thermistor 12. The system 10 includes a temperature sensing module 20, a temperature correction module 30, a component control module 40, and components 50. Specifically, the temperature sensing module 20 may sense temperature of a target environment 15 using the thermistor 12. For example, the thermistor 12 may include an NTC or a positive temperature coefficient (PTC) thermistor. Additionally, for example, the thermistor 12 may include a semiconductor-based thermistor, a ceramic-based thermistor, or a polymer-based thermistor. The thermistor 12, however, may also be a different type of thermistor and/or include different materials.

The temperature correction module 30 communicates with the temperature sensing module 20. Specifically, the temperature correction module 30 may determine parameters corresponding to the thermistor 12 by changing a resistance in series with the thermistor 12. Additionally, the temperature correction module 30 receives a signal from the temperature sensing module 20 indicating a temperature sensed by the thermistor 12. The temperature correction module 30 corrects the sensed temperature by compensating for self-heating effects of the thermistor 12. Specifically, the temperature correction module 30 may implement the system or method of the present disclosure. The temperature correction module 30 generates a signal indicating a corrected temperature.

The component control module 40 receives the signal from the temperature correction module 30 indicating the corrected temperature. The component control module 40 controls one or more of the components 50 based on the corrected temperature. For example, the components 50 may include any suitable component in a temperature-based system (i.e., components having temperature-based inputs). In other words, the component control module 40 may more accurately control the components 50 based on the corrected temperature. For example, in one implementation, the system 10 may be implemented in an engine system and the component control module 40 may control at least one component of the engine system.

More specifically, the system 10 may correct temperatures from one or more temperature sensors in the engine system. For example, the engine system may include an intake air temperature (IAT) sensor, an engine coolant temperature (ECT) sensor, and/or a transmission fluid temperature (TFT) sensor. The system 10, however, may also correct temperatures of other temperature sensors in the engine system. The corrected temperatures may then be used to control one or more components of the engine system. For example only, the component control module 40 may control a transmission and/or a heating, ventilating, and air conditioning (HVAC) system based on the corrected temperature.

Figure 3:
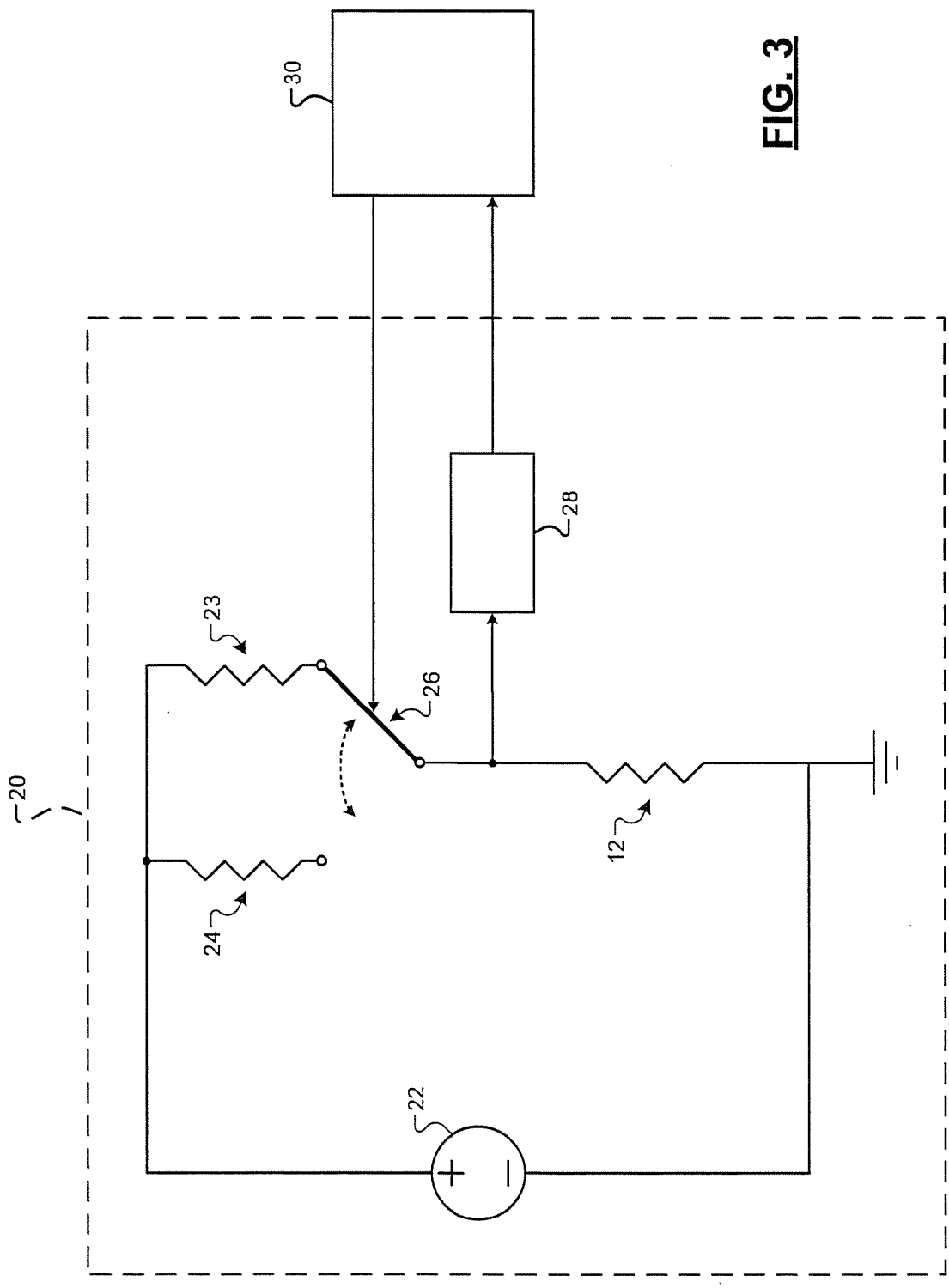
FIG. 3 is a schematic of a temperature sensing module according to one implementation of the present disclosure.

Referring now to FIG. 3, the temperature sensing module 20 is shown in more detail. The temperature sensing module 20 includes a voltage source 22, a first resistor 23, a second resistor 24, a switch 26, the thermistor 12, and an analog-to-digital (A-D) converter 28. Specifically, the switch 26 may control which of the first resistor 23 and the second resistor 24 are connected in series with the thermistor 12. For example, the switch 26 may be electrically controlled by the temperature correction module 30. The A-D converter 28 may convert a voltage between the switch 26 and the thermistor 12 to an electrical signal for the temperature correction module 30. For example, the electrical signal may be used to determine the temperature sensed by the thermistor 12 and/or the parameters of the thermistor 12.

More specifically, the parameters of the thermistor 12 include first and second temperatures of the thermistor 12 ($T_1$ and $T_2$, respectively) and first and second power dissipation values of the thermistor 12 ($P_1$ and $P_2$, respectively). The temperature correction module 30 may determine the parameters $T_1$, $T_2$, $P_1$, and $P_2$ based on the known voltage ($V_S$) from the voltage source 22 and the known resistances of resistors 23, 24 ($R_1$ and $R_2$, respectively). For example, the resistances $R_1$ and $R_2$ may be predetermined and stored in memory. Additionally, for example, the temperature correction module 30 may include a first module that determines parameters $T_1$ and $P_1$ and a second module that actuates the switch 26 and determines parameters $T_2$ and $P_2$.

First, the switch 26 may be actuated to connect the first resistor 23 in series with the thermistor 12. A voltage drop across the first resistor 23 may be determined as follows:

$$V_{R1} = V_S - V_T \tag{1},$$

where $V_{R1}$ represents the voltage drop across the first resistor 23, $V_S$ represents the source voltage, and $V_T$ represents a voltage drop across the thermistor 12 (i.e., $V_T = V_S - V_{R1}$).

The current through the first resistor 23 may then be determined as follows:

$$I_{R1} = V_{R1}/R_1 \tag{2},$$

where $I_{R1}$ represents the current through the first resistor 23 and $R_1$ represents the known resistance of the first resistor 23. A resistance of the thermistor 12 ($R_T$) may be determined as follows:

$$R_T = V_T/I_{R1} \tag{3}.$$

The first temperature $T_1$ of the thermistor 12 may then be determined based on the resistance $R_T$. For example, the first temperature $T_1$ may be determined using a characteristic math equation or lookup table relating various resistances to corresponding temperatures. Additionally, the first power dissipation value $P_1$ of the thermistor 12 may be determined as follows:

$$P_1 = V_T \times I_{R1} \tag{4}.$$

After the first temperature $T_1$ and the first power dissipation value $P_1$ are determined, the switch 26 may be switched to connect the second resistor 24 in series with the thermistor 12. A voltage drop across the second resistor 24 may be determined as follows:

$$V_{R2} = V_S - V_T \tag{5},$$

where $V_{R2}$ represents the voltage drop across the second resistor 24, $V_S$ represents the source voltage, and $V_T$ represents the voltage drop across the thermistor 12.

The current through the second resistor 24 may then be determined as follows:

$$I_{R2}=V_{R2}/R_2 \qquad (6),$$

where $I_{R2}$ represents the current through the first resistor 23 and $R_2$ represents the known resistance of the second resistor 24. The resistance of the thermistor 12 $R_T$ may the again be determined as follows:

$$R_T=V_T/I_{R2} \qquad (7),$$

where $V_T$ represents the voltage drop across the thermistor 12 (i.e., $V_T=V_S-V_{R1}$).

The second temperature $T_2$ of the thermistor 12 may then be determined based on the resistance $R_T$. For example, the second temperature $T_2$ may be determined by the characteristic math equation or using the lookup table relating various resistances to corresponding temperatures. Additionally, the second power dissipation value $P_2$ may be determined as follows:

$$P_2=V_T \times I_{R2} \qquad (8).$$

After the parameters $T_1$, $T_2$, $P_1$, and $P_2$ are determined, the temperature correction module 30 may determine the thermal dissipation factor ($\delta_T$) of the thermistor 12 based on the parameters. Specifically, the thermal dissipation factor $\delta_T$ may be determined as follows:

$$\delta_T=|P_2-P_1|/|T_1-T_2| \qquad (9).$$

The temperature correction module 30 may then determine a temperature error ($T_E$) based on the thermal dissipation factor $\delta_T$. Specifically, the temperature error $T_E$ may be determined as follows:

$$T_E=P/\delta_T \qquad (10),$$

where P represents a power dissipation value of the thermistor 12.

Finally, the temperature correction module 30 may correct the temperature sensed by the thermistor ($T_M$) based on the temperature error. Specifically, the corrected temperature ($T_C$) may be determined as follows:

$$T_C=T_M-T_E \qquad (11),$$

where $T_M$ represents the temperature sensed (i.e., measured) by the thermistor 12. Additionally, the process of determining the temperature error $T_E$ and correcting the temperature (see Equations 1-11) may be repeated as often as necessary. For example, the process may be repeated when conditions change (i.e., ambient temperature changes by more than a predetermined temperature threshold).

Figure 4:
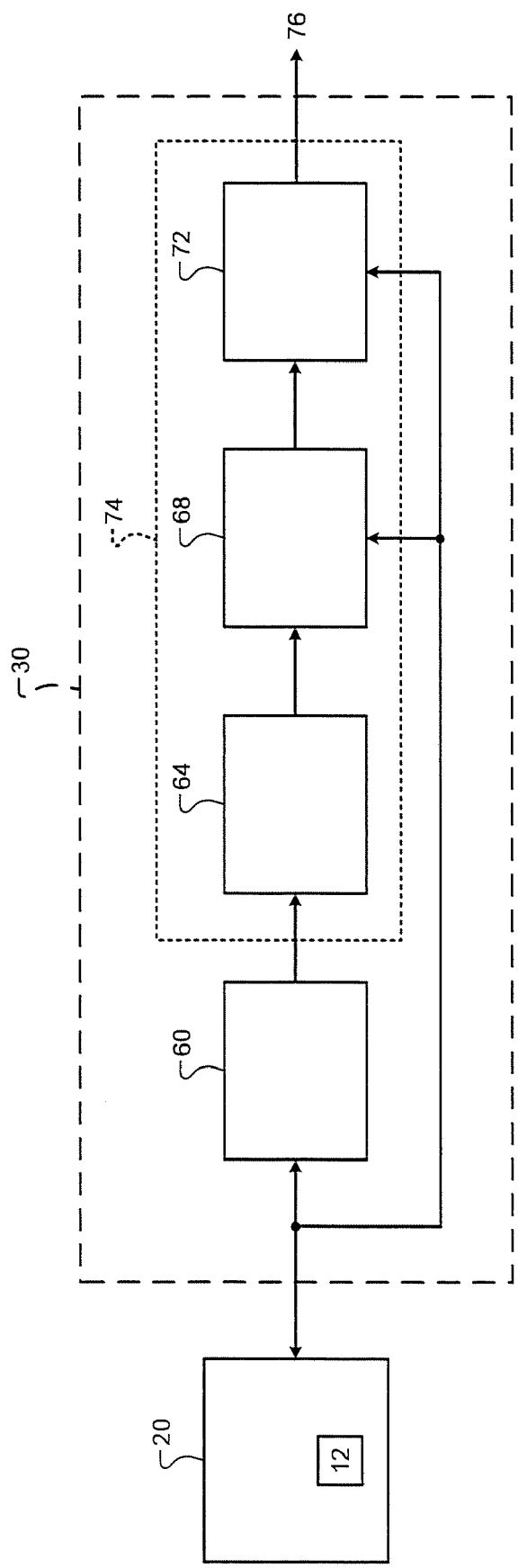
FIG. 4 is a functional block diagram of a temperature correction module according to one implementation of the present disclosure.

Referring now to FIG. 4, the temperature correction module 30 is shown in more detail. The temperature correction module 30 may include a parameter determination module 60, a factor determination module 64, an error determination module 68, and a correction module 72. As previously described, the parameter determination module 60 may include a first module that determines parameters $T_1$ and $P_1$ and a second module that actuates the switch 26 and determines parameters $T_2$ and $P_2$. Additionally, the factor determination module 64, the error determination module 68, and the correction module 72 may be collectively referred to as a third module 74. The temperature correction module 30 may also include memory (not shown) for storing predetermined and/or determined parameters. For example, the memory (not shown) may include non-volatile memory (NVM).

The parameter determination module 60 communicates with the temperature sensing module 20. Specifically, the parameter determination module 60 may control the switch 26 and receive signals from the A-D converter 28. The parameter determination module 60 may determine the parameters $T_1$, $T_2$, $P_1$, and $P_2$ based on the signals received from the A-D converter 28. For example, the parameter determination module 60 may determine the parameters as previously described with reference to Equations 1-8.

The factor determination module 64 receives the parameters $T_1$, $T_2$, $P_1$, and $P_2$ from the parameter determination module 60. The factor determination module 64 determines the thermal dissipation factor $\delta_T$ based on the parameters $T_1$, $T_2$, $P_1$, and $P_2$. For example, the factor determination module 64 may determine the thermal dissipation factor $\delta_T$ as previously described with reference to Equation 9.

The error determination module 68 receives the thermal dissipation factor $\delta_T$ from the factor determination module 64. The error determination module 68 may also receive a signal indicating the power dissipation value P of the thermistor 12. For example, the signal indicating the power dissipation value P may be sent by the temperature sensing module 20 or the parameter determination module 60. The error determination module 68 may determine the temperature error $T_E$ based on the thermal dissipation factor $\delta_T$ and the power dissipation value P. For example, the error determination module 68 may determine the temperature error $T_E$ as previously described with reference to Equation 10.

The correction module 72 receives the temperature error $T_E$ from the error determination module 68. The correction module 72 may also receive a signal indicating a temperature $T_M$ sensed (i.e., measured) by the thermistor 12. In other words, the temperature $T_M$ may be measured by the thermistor 12 after the parameters are determined. For example, the signal indicating the temperature $T_M$ may be sent by the temperature sensing module 20 or the parameter determination module 60. The correction module 72 may correct the measured temperature $T_M$ based on the temperature error $T_E$.

Rather, the correction module 72 may generate the corrected temperature $T_C$. For example, the correction module 72 may generate the corrected temperature $T_C$ as previously described with reference to Equation 11. The correction module 72 may then output the corrected temperature $T_C$ to be used in temperature-based control of the system 10 (i.e., components 50). For example, the correction module 72 may generate a signal 76 indicating the corrected temperature $T_C$ to be received and used by the component control module 40.

Figure 5:
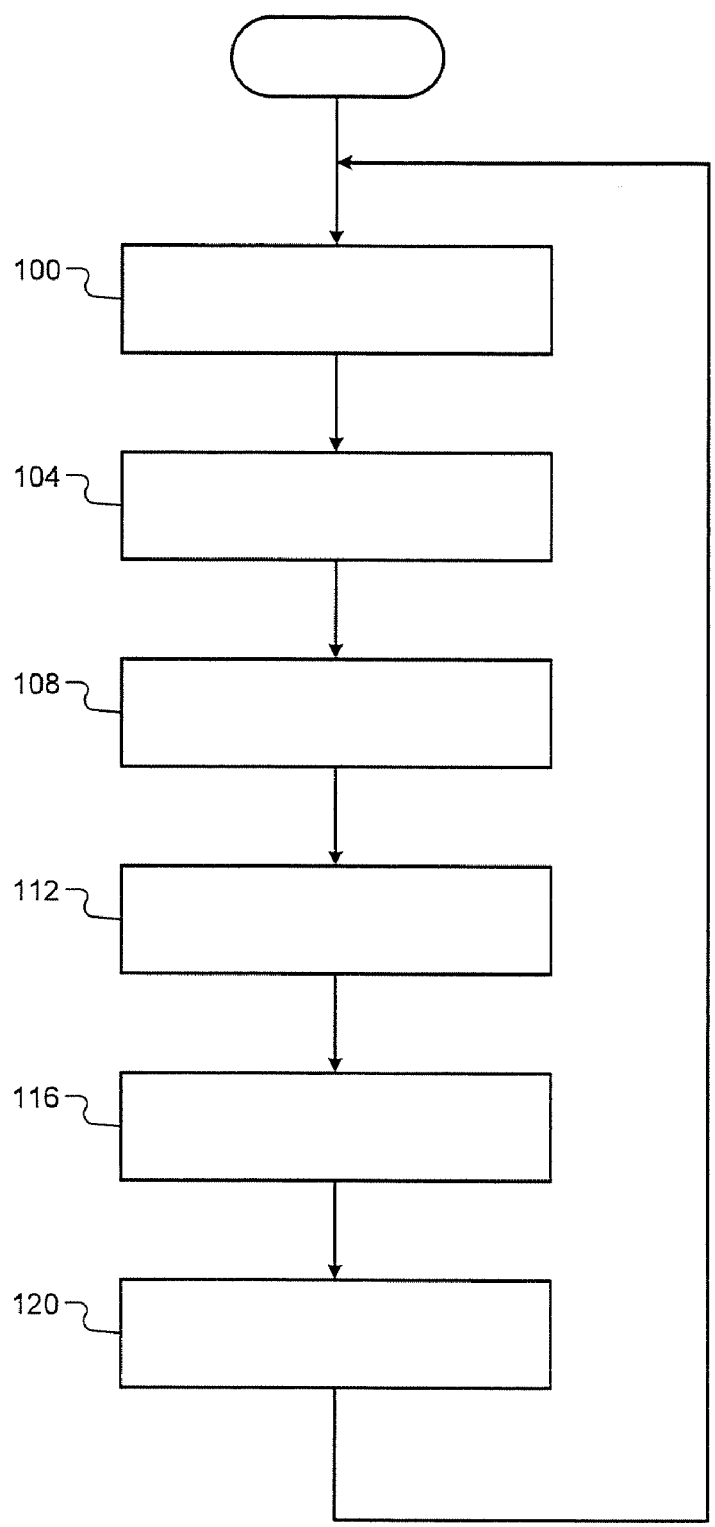
FIG. 5 is a flow diagram of a method for correcting temperature sensed by a thermistor according to one implementation of the present disclosure.

Referring now to FIG. 5, a method for correcting temperature sensed by a thermistor begins at 100. At 100, the system 10 may determine the first temperature $T_1$ and the first power dissipation value $P_1$ of the thermistor 12 based on the first resistance $R_1$ (see, for example, Equations 1-4). For example, the switch 26 may be actuated to connect the first resistor 23 in series with the thermistor 12 (see FIG. 3).

At 104, the system 10 may determine the second temperature $T_2$ and the second power dissipation value $P_2$ of the thermistor 12 based on the second resistance $R_2$ (see, for example, Equations 5-8). For example, the switch 26 may be actuated to connect the second resistor 24 in series with the thermistor 12 (see FIG. 3).

At 108, the system 10 may determine the thermal dissipation factor $\delta_T$ based on the first and second temperatures $T_1$, $T_2$ and the first and second power dissipation values $P_1$, $P_2$ (see, for example, Equation 9). At 112, the system 10 may determine the temperature error $T_E$ based on the thermal dissipation factor $\delta_T$ (see, for example, Equation 10).

At 116, the system 10 may correct the temperature $T_M$ sensed by the thermistor 12 based on the temperature error $T_E$. For example, the system 10 may generate the corrected temperature $T_C$ based on the temperature error $T_E$ (see, for example, Equation 11). At 120, the system 10 may control one or more of the components 50 based on the corrected temperature T$_C$. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
    a first module that determines a first temperature and a first power dissipation value of a thermistor based on a resistance of a first resistor connected in series with the thermistor;
    a second module that, after disconnecting the first resistor and connecting a second resistor in series with the thermistor, determines a second temperature and a second power dissipation value of the thermistor based on a resistance of the second resistor; and
    a third module that determines a thermal dissipation factor based on the first and second temperatures and the first and second power dissipation values, and that corrects temperature sensed by the thermistor based on the thermal dissipation factor.

2. The system of claim 1, wherein the first and second resistances are different, and wherein a switch disconnects the first resistor and connects the second resistor in series with the thermistor.

3. The system of claim 1, wherein the first and second modules use one of a characteristic equation and a lookup table to determine the first and second temperatures based on the first and second resistances, respectively.

4. The system of claim 1, wherein the third module further includes a factor determination module that determines the thermal dissipation factor by dividing (i) an absolute value of a difference between the second power and the first power by (ii) an absolute value of a difference between the first temperature and the second temperature.

5. The system of claim 1, wherein the third module further includes an error determination module that determines a temperature error of the thermistor based on the thermal dissipation factor.

6. The system of claim 5, wherein the error determination module determines the temperature error by dividing (i) a power dissipated by the thermistor by (ii) the thermal dissipation factor.

7. The system of claim 6, wherein the third module further includes a correction module that corrects the temperature sensed by the thermistor based on the temperature error.

8. The system of claim 7, wherein the correction module corrects the temperature sensed by the thermistor by subtracting (i) the temperature error from (ii) the temperature sensed by the thermistor.

9. The system of claim 1, wherein the thermistor includes a negative temperature coefficient (NTC) thermistor or a positive temperature coefficient (PTC) thermistor, and wherein the thermistor includes a semiconductor-based thermistor, a ceramic-based thermistor, or a polymer-based thermistor.

10. An engine control system comprising the system of claim 1, wherein the thermistor senses a temperature of a component of an engine.

11. A method, comprising:
    determining a first temperature and a first power dissipation value of a thermistor based on a resistance of a first resistor connected in series with the thermistor;
    disconnecting the first resistor and connecting a second resistor in series with the thermistor;
    determining a second temperature and a second power dissipation value of the thermistor based on a resistance of the second resistor;
    determining a thermal dissipation factor based on the first and second temperatures and the first and second power dissipation values; and
    correcting temperature sensed by the thermistor based on the thermal dissipation factor.

12. The method of claim 11, wherein the first and second resistances are different, and further comprising disconnecting the first resistor and connects the second resistor in series with the thermistor using a switch.

13. The method of claim 11, further comprising using one of a characteristic equation and a lookup table to determine the first and second temperatures based on the first and second resistances, respectively.

14. The method of claim 11, further comprising determining the thermal dissipation factor by dividing an (i) absolute value of a difference between the second power and the first power by (ii) an absolute value of a difference between the first temperature and the second temperature.

15. The method of claim 11, further comprising determining a temperature error of the thermistor based on the thermal dissipation factor.

16. The method of claim 15, further comprising determining the temperature error by dividing (i) a power dissipated by the thermistor by (ii) the thermal dissipation factor.

17. The method of claim 16, further comprising correcting the temperature sensed by the thermistor based on the temperature error.

18. The method of claim 17, further comprising correcting the temperature sensed by the thermistor by subtracting (i) the temperature error from (ii) the temperature sensed by the thermistor.

19. The method of claim 11, wherein the thermistor includes a negative temperature coefficient (NTC) thermistor or a positive temperature coefficient (PTC) thermistor, and wherein the thermistor includes a semiconductor-based thermistor, a ceramic-based thermistor, or a polymer-based thermistor.

20. A method for controlling an engine comprising the method of claim 11, wherein the thermistor senses a temperature of a component of the engine.

* * * * *